RE 24757
Aug. 18, 1959     A. R. CUNNINGHAM     2,899,795
ADJUSTABLE DRAG FOR TEDDER
Filed Feb. 25, 1958
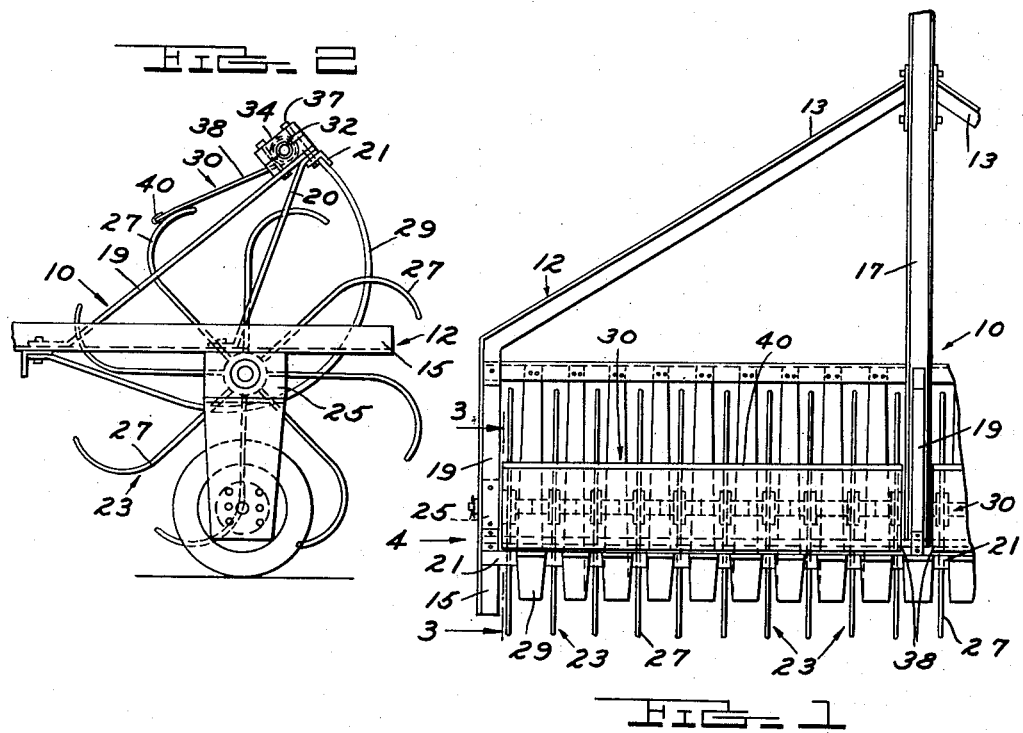
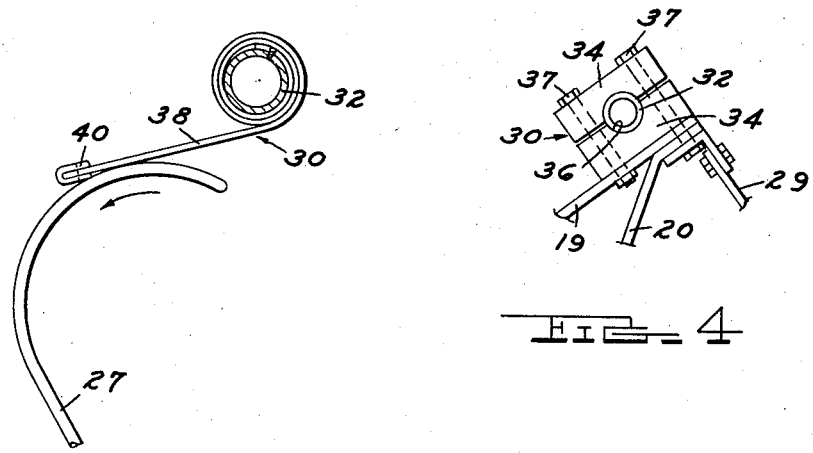
INVENTOR.
ARTHUR RAYMOND CUNNINGHAM
BY
ATTORNEYS

2,899,795
ADJUSTABLE DRAG FOR TEDDER

Arthur Raymond Cunningham, Chicago, Ill.

Application February 25, 1958, Serial No. 717,345

10 Claims. (Cl. 56—370)

The present invention relates to an improvement in an adjustable drag device for a hay tedder, or for a comparable tined type of mobile implement employed in the field handling of hay and other cut grasses.

The tedder of the present invention comprises a bank of rotatable tine units, each including a circumferential series of curved, radially spaced radial tines, there being a plurality of the rotative tine units spaced longitudinally along a common axis. It is the purpose of these tine units, as the tedder is advanced, to either walk along the ground surface or if supported on ground wheels, to be rotated by the traction of engagement with cut hay, in either case to lift the hay in loose bundles and drop it to the rear in a loosened, ruffled condition which enhances its drying. It has been found that the tine units, particularly when ground wheel supported, sometimes spin too fast and fail to pick up the hay satisfactorily.

Therefore, a general object of the present invention is to provide an adjustable drag of simple, inexpensive character, for a tine implement of the type described, whereby a desired degree of resistance may be imposed on the free rotation of the tine units, thereby to prevent their spinning at excessive speed and improve their tedding action accordingly.

More specifically, it is an object to provide an adjustable drag for this function which is in the form of a length of flexible, wear resistant material such as canvas, flexible composition material or the like.

Another object is to provide a drag as described, in which the flexible member is rolled in reel form about a transverse trunnion mounted by the implement frame. The flexible drag extends and depends forwardly and downwardly over the tops and curved ends of the rotating tines, frictionally impeding the same as desired, as well as assisting in preventing possible clogging between adjacent tines.

A further object is to provide an anti-spin drag in the form of a flexible member having frictional wiping engagement with rotating tines, in which the provisions for mounting the drag member on the tedder frame permit adjustment of the depending length of the drag, with corresponding control of the degree of anti-spin drag exerted thereby.

The foregoing as well as other objects will become more apparent as this description proceeds, especially when considered in connection with the accompanying drawing illustrating a preferred embodiment of the invention, wherein:

Fig. 1 is a fragmentary top plan view more or less conventionally illustrating a tine-wheel type tedder equipped with the improved drag of the invention;

Fig. 2 is a fragmentary, somewhat enlarged, side elevational view of the equipment;

Fig. 3 is a view in vertical section in enlarged scale along line 3—3 of Fig. 2, further showing the manner of coiling a drag for desired letout; and Fig. 4 is a fragmentary end elevational view in enlarged scale, from the arrow 4 of Fig. 1, of adjustable clamping means for the ends of the mounting trunnion about which the drag is wound.

Referring to Figs. 1 and 2, the reference numeral 10 generally designates a hay tedder unit or attachment. It is characterized by an angle iron draft frame 12, including rearwardly divergent yoke arms 13 paralleling one another at rear angled extensions 15. There is also a central draft tongue 17 on the frame 12, and the rear frame extensions 15 and tongue 17 are provided with rearwardly and upwardly inclined braces or brackets 19. These brackets, with the assistance of further, more abruptly upward brackets 20, support a pair of transversely aligned angle irons 21 to provide a cross support.

The tedder includes an axial series of tine carrying wheels, comprised of parallel tedder tine units 23 appropriately journalled in frame and draft tongue pillow blocks 25. The tedder units 23 include curvedly ended tines 27 of resilient wire stock, and the cross members 21 in part sustain sheet metal guards 29 disposed between successive tine units 23 to strip and prevent clogging of hay in the latter.

The reference numeral 30 generally designates the adjustable drag of the present improvement. It includes a suitable transverse trunnion 32, preferably in the form of a pipe of appropriate diameter, of a length to extend the full transverse distance across the side frame and tongue brackets 19, and the ends and middle of the trunnion pipe 32 are received and adjustably anchored by coacting wooden clamp blocks 34 bolted to the upper and rear ends of the brackets 19. Blocks 34 are provided with appropriate arcuate seats 36 for the reception of the trunnion ends, between which said ends are fixedly clamped by bolts or studs 37.

A flexible drag member 38 of canvas, flexible reinforced fabric or composition, or other suitable drag material, of a transverse width approximating the distance between the respective frame extensions 15 and the tongue 17, is secured along one horizontal margin thereof to the trunnions 32 on either side of tongue 17. The remainder of the drag 38 is wound in clockwise direction about the trunnion 32, as viewed in Fig. 3, and its opposite free margin projects outwardly, forwardly and downwardly over the ends of the tine units 23. This margin is preferably appropriately weighted, as at a transverse hem member 40, enabling the drag edge to fall into the spaces between successive curved tines as the same rotate forwardly and counterclockwise in the direction indicated by the arrow in Fig. 3.

This imposes a desired frictional drag upon the tine units 23, the extent of which is determined by the degree of unwinding of the drag 38. This is easily adjusted by loosening the clamp blocks 34 and unreeling drag as may be required by the field conditions encountered, then taking up the bolts 37.

An anti-spin drag of very economical construction yet efficient operation is provided which greatly improves the pick up ability of the tines, to correspondingly improve the performance of the implement as a whole.

What I claim as my invention is:

1. An adjustable drag to control spin of a tedder or like field implement having a frame rotatively supporting an axial series of tine carrying wheels, comprising a cross support carried by said frame and extending across the said tine wheels, and a flexible sheet-like drag member having means securing the same to said support to extend therefrom to a position in the path of movement of said tine wheels to be successively frictionally engaged from beneath by the tines of said wheels to control spin thereof.

2. An adjustable drag to control spin of a tedder or like field implement having a frame rotatively supporting an axial series of tine carrying wheels, comprising a cross support carried by said frame and extending across the said tine wheels, and a flexible sheet-like drag member having means securing the same to said support to extend transversely therefrom over the tines of said wheels to a position in the path of movement of said tine wheels to be successively frictionally engaged from beneath by said tines to control spin thereof.

3. An adjustable drag to control spin of a tedder or like field implement having a frame rotatively supporting an axial series of tine carrying wheels, comprising a cross support carried by said frame and extending above and across the said tine wheels, and a flexible sheet-like drag member having means securing the same to said support to extend transversely therefrom over the tines of said wheels to a position in the path of movement of said tine wheels to be successively frictionally engaged from beneath by said tines to control spin thereof.

4. An adjustable drag to control spin of a tedder or like field implement having a frame rotatively supporting an axial series of tine carrying wheels, comprising a cross support carried by said frame and extending above and across the said tine wheels, and a flexible sheet-like drag member having means securing the same to said support to extend forwardly therefrom over the tines of said wheels to a position in the path of movement of said tine wheels to be successively frictionally engaged from beneath by said tines to control spin thereof.

5. An adjustable drag to control spin of a tedder or like field implement having a frame rotatively supporting an axial series of tine carrying wheels, comprising a cross support carried by said frame and extending above and across the said tine wheels, a flexible sheet-like drag member having means securing the same to said support to extend transversely therefrom over the tines of said wheels to a position in the path of movement of said tine wheels to be successively frictionally engaged from beneath by said tines to control spin thereof, said drag member being secured to said support and having a substantial portion of its length wound therearound, and means to rotatively adjust said support to vary the transversely extending length of said drag member and thereby vary its frictional, anti-spin effect on said tines.

6. An adjustable drag to control spin of a tedder or like field implement having a frame rotatively supporting an axial series of tine carrying wheels, comprising a cross support carried by said frame and extending above and across the said tine wheels, a flexible sheet-like drag member having means securing the same to said support to extend forwardly therefrom over the tines of said wheels to a position in the path of movement of said tine wheels to be successively frictionally engaged from beneath by said tines to control spin thereof, said drag member being secured to said support and having a substantial portion of its length wound therearound, and means to rotatively adjust said support to vary the forwardly extending length of said drag member and thereby vary its frictional, anti-spin effect on said tines.

7. A tedder or like field implement having a frame rotatively supporting an axial series of tine carrying wheels, and an adjustable drag device to frictionally control spin of the tines of said wheels, comprising an elongated trunnion carried at its ends by said frame and extending above and across the said tine wheels, a flexible sheet-like drag member having means securing the same to said trunnion to extend transversely therefrom over the tines of said wheels to a position in the path of movement of said tine wheels to be successively frictionally engaged from beneath by said tines to control spin thereof, said drag member being secured to said trunnion and having a substantial portion of its length wound therearound, and means to rotatively adjust said support to vary the transversely extending length of said drag member and thereby vary its frictional, anti-spin effect on said tines.

8. A tedder or like field implement having a frame rotatively supporting an axial series of tine carrying wheels, and an adjustable drag device to frictionally control spin of the tines of said wheels, comprising an elongated trunnion carried at its ends by said frame and extending above and across the said tine wheels, a flexible sheet-like drag member having means securing the same to said trunnion to extend forwardly therefrom over the tines of said wheels to a position in the path of movement of said tine wheels to be successively frictionally engaged from beneath by said tines to control spin thereof, said drag member being secured to said trunnion and having a substantial portion of its length wound therearound, and means to rotatively adjust said support to vary the forwardly extending length of said drag member and thereby vary its frictional, anti-spin effect on said tines.

9. An adjustable drag to control spin of a tedder or like field implement having a frame rotatively supporting an axial series of tine carrying wheels, comprising a support carried by said frame, and a sheet-like drag member having means securing the same to said support to extend therefrom to a position in the path of movement of tines of said tine wheels to be successively engaged frictionally by said tines and control spin of said wheels.

10. An adjustable drag to control spin of a tedder or like field implement having a frame rotatively supporting an axial series of tine carrying wheels, comprising a support carried by said frame, and a sheet-like drag member having means securing the same to said support to extend therefrom to a position in the path of movement of tines of said tine wheels to be successively engaged frictionally by said tines and control spin of said wheels, said securing means comprising an elongated rotative member extending transversely of said frame and mounted for rotation by said support, said drag member comprising a flexible member wound about said rotative member and adjustable to control the position of the drag member for engagement by said tines by rotation of said rotative member.

References Cited in the file of this patent

UNITED STATES PATENTS

| | | |
|---|---|---|
| 1,500,273 | Sattler | July 8, 1924 |
| 2,703,957 | Russell | Mar. 15, 1955 |
| 2,718,746 | Prischmann | Sept. 27, 1955 |
| 2,771,732 | Schramling | Nov. 27, 1956 |